United States Patent [19]

StrigÅrd et al.

[11] Patent Number: 4,969,365

[45] Date of Patent: Nov. 13, 1990

[54] METHOD AND APPARATUS FOR MEASURING THE VOLUME OF A FLOWING LIQUID

[75] Inventors: Bengt-Olof StrigÅrd, Malmö; Tord Andreasson, Lund, both of Sweden

[73] Assignee: Ljungmans Industrier AB, Sweden

[21] Appl. No.: 449,509

[22] Filed: Dec. 4, 1989

Related U.S. Application Data

[63] Continuation of Ser. No. 294,068, Dec. 21, 1988, abandoned.

[30] Foreign Application Priority Data

Apr. 24, 1987 [SE] Sweden .................................. 8701686

[51] Int. Cl.⁵ ...................... G01F 15/02; G01F 15/075
[52] U.S. Cl. .............................. 73/861.77; 73/861.03; 364/510
[58] Field of Search .................... 73/861.03, 861.77; 364/510

[56] References Cited

U.S. PATENT DOCUMENTS

| | | |
|---|---|---|
| 3,802,261 | 4/1974 | Zimmerman et al. |
| 3,945,253 | 3/1976 | Liu et al. |
| 3,965,341 | 6/1976 | Honey et al. |
| 4,056,717 | 11/1977 | Cornforth ........................ 364/510 |
| 4,203,323 | 5/1980 | Thorsell et al. |
| 4,390,956 | 6/1983 | Cornforth et al. ................ 364/510 |
| 4,581,946 | 4/1986 | Kanayama ...................... 73/861.77 |
| 4,720,800 | 1/1988 | Suzuki et al. ..................... 364/510 |

FOREIGN PATENT DOCUMENTS

| | | |
|---|---|---|
| 0011787 | 6/1980 | European Pat. Off. |
| 0100844 | 2/1984 | European Pat. Off. |
| 3010263 | 4/1981 | Fed. Rep. of Germany |
| 1482279 | 8/1977 | United Kingdom |
| 1501877 | 2/1978 | United Kingdom |
| 2053485 | 2/1981 | United Kingdom |

*Primary Examiner*—Charles A. Ruehl
*Attorney, Agent, or Firm*—Merchant, Gould, Smith, Edell, Welter & Schmidt

[57] ABSTRACT

In a method for measuring the volume of a liquid flow through a measuring chamber (2) during a measuring period, a pulse generator (12) is caused to emit a number of pulses corresponding to the volume. In the measurement, the measuring period is divided into a number of measuring intervals. During each measuring interval, the pulses from the pulse generator (12) are detected, each detected pulse is multiplied by a flow correction factor, the corrected pulse values are added to a summation variable, and this summation variable is multiplied by a volume conversion factor for determining the liquid volume. The separate determined liquid volumes are thereafter summed up for all measuring intervals during the measuring period.

A measuring apparatus for measuring the volume of a liquid flow through a measuring chamber (2) has a pulse generator (21, 23) for generating a number of pulses corresponding to the volume, has time base means (33) for dividing the measuring period into measuring intervals, memory means (34) for storing one or more correction factors, pulse-correcting computing means (24, 25) for multiplying each detected pulse by said one or more correction factors, adder means (26, 27) for adding the corrected pulse values, and multiplier means (35) for multiplying the added corrected pulse values by a volume conversion factor.

8 Claims, 4 Drawing Sheets

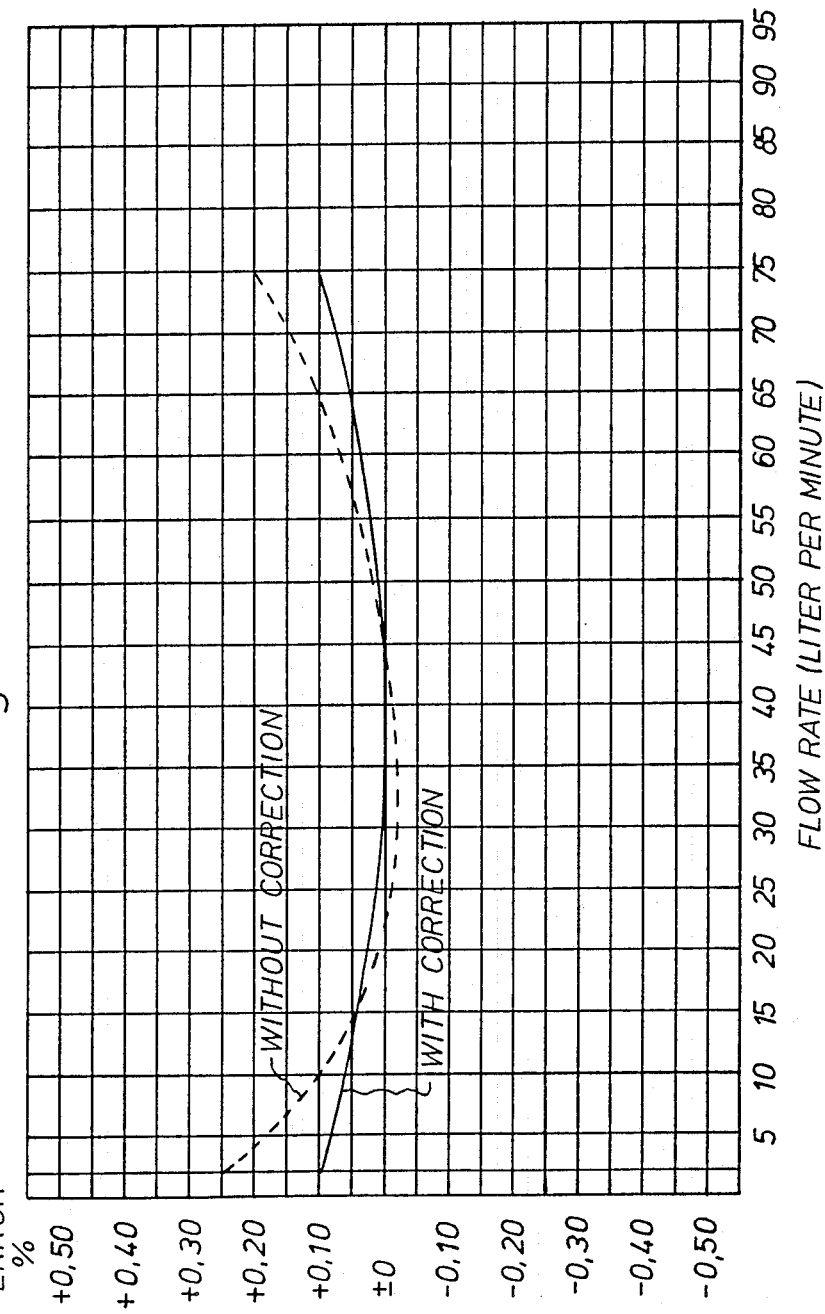

METHOD AND APPARATUS FOR MEASURING THE VOLUME OF A FLOWING LIQUID

This is a continuation of application Ser. No. 294,068, filed Dec. 21, 1988, now abandoned.

The present invention relates to a method for measuring the volume of a liquid flowing through a measuring chamber during a measuring period, during which a number of pulses corresponding to the volume is generated by a pulse generator, which method comprises the steps of dividing the measuring period into a number of measuring intervals, detecting the pulses during each measuring interval, and multiplying the detected pulses by a flow correction factor. The invention also relates to an apparatus for carrying out this method.

Methods and apparatus of this type are often used in connection with fuel pumps. For measuring the fuel volume, these pumps most often have movable pistons which are disposed in the measuring chamber and arranged to be displaced by the liquid the volume of which should be measured, and connected to a rotary shaft assembly driving said pulse generator. Such an apparatus is disclosed in No. DE-A-2,926,451.

The measuring apparatus disclosed in No. DE-A-2,926,451 is intended for a fuel pump and comprises movable pistons disposed in the measuring chamber and displaced by the action of the liquid. The movement of the pistons is transmitted to a crankshaft the rotation of which is a function of the volume of the liquid flowing through the measuring chamber. The crankshaft extends through the wall of the measuring chamber and its end located outside the measuring chamber is connected to a pulse generator which comprises an apertured disk, an optical transmitter and an optical receiver, and emits a predetermined number of pulses for each revolution the crankshaft rotates. If the volume corresponding to one revolution of the crankshaft is known, i.e. the proportionality factor between the number of pulses and the volume, it is possible to measure the volume of the liquid which flows through the measuring chamber during a measuring period, by counting the number of pulses emitted by the pulse generator during the measuring period and multiplying this number by the proportionality factor. Since the pulses from the measuring apparatus described above are generally supplied directly to a volume counter, it is convenient that the same number of pulses always corresponds to the same volume irrespective of the measuring apparatus, such that the same factor for converting pulse number to volume can be used in all counters irrespective of what measuring apparatus they are connected to. However, for constructional reasons and depending on the liquid for which the measuring apparatus is used, the proportionality factor in practice varies for different measuring apparatus. As shown in the above-mentioned No. DE-A-2,926,451, this problem can however be solved by means of a correcting unit which is disposed after the pulse generator and in which the number of pulses counted is multiplied by a set correction factor, such that the desired pulse-to-volume ratio is obtained. Another known way of solving the contemplated problems is setting the stroke length of the pistons such that one revolution of the shaft corresponds to the desired volume. In a known measuring apparatus sold by the applicant, this is carried out manually with the aid of an eccentric assembly.

The above-described apparatus and measuring methods however suffer from other problems and shortcomings to which no satisfactory solution has yet been found.

One constructional drawback inherent in the apparatus described above relates to the calibration of the measuring apparatus in order to obtain the desired ratio of pulse number to volume. The eccentric assembly is complicated and comprises many parts, which means that the mounting operation becomes time-consuming and maintenance extensive. Further, both apparatus require manual calibration when the ratio of pulse number to volume changes as a result of aging and wear. A further drawback is that the apparatus are not sufficiently tamper-proof.

Other problems and drawbacks relate to the measuring accuracy. It is of course desirable to obtain maximum measuring accuracy and e.g. in metering apparatus in petrol pumps, limits are set for the maximum permissible measuring error. Although present-day measuring apparatus have acceptable measuring accuracy, the size of the measuring error depends on the flow rate of the liquid, such that the measuring error becomes considerably larger at very small and at very high flow rates than at intermediate flow rates, which is by no means satisfactory. Further, according as the apparatus ages and is worn, the measuring error increases, meaning that the apparatus, as mentioned above, must be recalibrated.

No. EP-A-0,011,787 describes a known construction for correcting flow rate-dependent measuring errors in a measuring apparatus comprising an impeller or turbine wheel rotating in a liquid flow and driving a pulse generator. The problem to be solved by means of this known device resides in the fact that the rotation of the turbine wheel is not strictly proportional to the passing liquid volume, especially at small flows. In one of the embodiments described (FIG. 10), use is made of a measuring circuit 66 dividing the measuring period into a number of part measuring periods, e.g. of a duration of 6 sec. The measuring circuit has a counter 70 which during each part measuring period counts the number of pulses supplied from the turbine wheel. The number of pulses which is counted during one part measuring period and is a measurement of the flow rate during this part measuring period is supplied as a signal MS to a memory 62 storing some type of correction values as a function of the number of pulses. The value read from the memory 62 is multiplied by the signal MS in a multiplier 100 and added in an adder 64 to the sum of the corrected volume values determined for the preceding part measuring periods. The new sum is thereafter supplied to a register 65 and thereafter to an indicator. No. EP-A-0,011,787 thus teaches the correction of volume measuring values for errors which are dependent on the flow rate, this correction being carried out on the basis of correction factors which are dependent on the flow rate and stored in a memory. Even if this correction is an improvement over the prior art technique, it is not sufficient in view of the stringent requirements set within e.g. the fuel distribution field. Moreover, the equipment is such that it necessitates modifications in that part of the existing equipments which indicates the measured values.

Other known apparatus and methods are described in No. DE-B-1,966,331, No. DE-A-2,850,671, No. DE-A-3,010,263, No. EP-A-0,100,844, No. GB-A-1,482,279, No. GB-A1,501,877, U.S. Pat. No. 3,945,253 and U.S.

Pat. No. 3,965,341. These known apparatus and methods suffer from one or more of the above-mentioned drawbacks and do not give sufficiently accurate and corrected measuring values with regard to current requirements in e.g. in the fuel distribution field.

Another drawback of the known measuring apparatus is that they do not take into account the temperature of the measured liquid. As is well known, the volume of liquids is temperature-dependent, which means that, e.g. when filling up a petrol tank, less energy per unit of volume is had the higher the temperature of the petrol is. Thus, it would be more reasonable if the petrol was paid for on the basis of the energy content instead of the volume. To this end, it is desirable to provide a measuring apparatus which can also determine the volume corresponding to a predetermined standard temperature.

One object of the present invention is to provide a new method and a new apparatus for eliminating or considerably reducing one or more of the shortcomings inherent in known methods and apparatus. Thus, one object of the invention is to increase the measuring accuracy. Another preferred object is to provide an almost instantaneous correction of the measuring values to permit installing the invention in existing measuring equipments without the need to modify the existing indicating equipment and other equipment connected thereafter. A further, preferred object is to permit correcting the volume measuring values with regard to temperature variations of the measured volume of liquid flow. Yet another preferred embodiment is to permit making corrections with regard to aging and wear of the volume measuring parts of the measuring equipment.

The invention therefore provides a method of the type stated in the introduction to this specification, which is characterized by the steps, during each measuring interval, of detecting the pulses from the pulse generator, multiplying each separate detected pulse by a flow correction factor, which has been selected on the basis of the sum of the corrected pulse values for one or more of the preceding measuring intervals, adding the corrected pulse values to a summation variable and multiplying the value of this summation variable by a volume conversion factor for determining the liquid volume during the measuring interval concerned, and by the step of summing up the liquid volumes for all measuring intervals during said measuring period.

In a preferred further development of the invention, an almost instantaneous correction of the measuring values obtained is achieved in that the step of adding the corrected pulse values to the summation variable is carried out by adding each corrected pulse value to an intermediate storage variable, by determining the integer part of the value of the intermediate storage variable, by subtracting this integer part from said intermediate storage variable and by adding this integer part to said summation variable.

To permit measuring a liquid flow in both directions through the measuring equipment, it is preferred according to another embodiment of the invention to carry out the measurement by means of two pulse generators emitting a number of pulses corresponding to the volume when the liquid is flowing in one or the other direction through the measuring chamber, this embodiment comprising the steps, during each separate measuring interval, of detecting the pulses from the first and the second pulse generator, multiplying each separate detected pulse by the flow correction factor, adding the corrected pulse values of the first pulse generator to a first summation variable, adding the corrected pulse values of the second pulse generator to a second summation variable, and subtracting the second summation variable from the first summation variable before the step of multiplying the value of this summation variable by the volume conversion factor. In this embodiment of the invention, it is also preferred to carry out the step of adding the corrected pulse values to the second summation variable by adding each corrected pulse value to a second intermediate storage variable, by determining the integer part of the value of the second intermediate storage variable, by subtracting said integer part from said second intermediate storage variable and by adding this integer part to said second summation variable.

When carrying out the method according to the invention, it is preferred that the flow correction factor has a value within the range of 0.0000–2 0000.

In order to further increase the instantaneous measuring accuracy, the method according to a preferred further development of the invention comprises the steps, during each measuring interval, of integer-dividing the value of the summation variable by a first scale factor if the value of the summation variable is above 0, and by a second scale factor if the value of the summation variable is below 0, setting said summation variable equal to the remainder of the integer division, and multiplying the result of the integer division by the volume conversion factor for determining the liquid volume.

To achieve the above-mentioned object of temperature correction of the measuring values, the method according to a preferred further development of the invention comprises the steps, during each measuring interval, of correcting each detected pulse by a temperature correction factor, which has been selected on the basis of the temperature determined during the preceding measuring interval.

To achieve the above-mentioned object of aging correction of the measuring values, the method according to a preferred further development of the invention comprises the steps, during each measuring interval, of correcting each detected pulse by an aging correction factor which has been selected on the basis of the total liquid volume that has flown through the measuring chamber.

As stated above, the invention also relates to an apparatus for measuring the volume of a liquid flowing through a measuring chamber during a measuring period. This apparatus has a pulse generator for emitting a number of pulses corresponding to the volume; detector means for detecting the pulses emitted by the pulse generator; time base means for dividing the measuring period into measuring intervals, the apparatus being characterized according to the invention by memory means for storing one or more correction factors; multiplier means for multiplying each pulse detected by said detector means by said one or more correction factors; adder means for adding the corrected pulse values, and multiplier means for multiplying the sum of the added corrected pulse values by a volume conversion factor.

In the preferred embodiments of the invention, the measuring accuracy is enhanced, the need for manual recalibration because of wear is reduced or eliminated, and it becomes possible to charge the consumer on the basis of the energy content and not the temperature-dependent volume. Also, the apparatus becomes more tamper-proof.

The invention is primarily intended to be used in metering devices in filling stations and used for measuring the volume of fuel dispensed, but it may also be used for measuring larger volumes, for instance the volume of fuel supplied from a petrol truck to a tank or from a petrol store to a petrol truck.

The invention will now be described in more detail hereinbelow with reference to the accompanying drawings which show preferred embodiments of the invention and in which:

FIG. 1 is a part sectional view of one example of a fuel meter in which the inventive concepts can advantageously be applied;

FIG. 2 schematically shows a section taken along the line II—II in FIG. 1;

FIG. 3 schematically shows on a larger scale a part of the fuel meter in FIGS. 1 and 2, supplemented with details included in an embodiment of the apparatus according to the invention;

FIG. 5 is a diagram illustrating the dependence of the volume measurement error on the flow rate before and after electronic correction of the measuring values in an embodiment using the method according to the invention.

Figure 1:
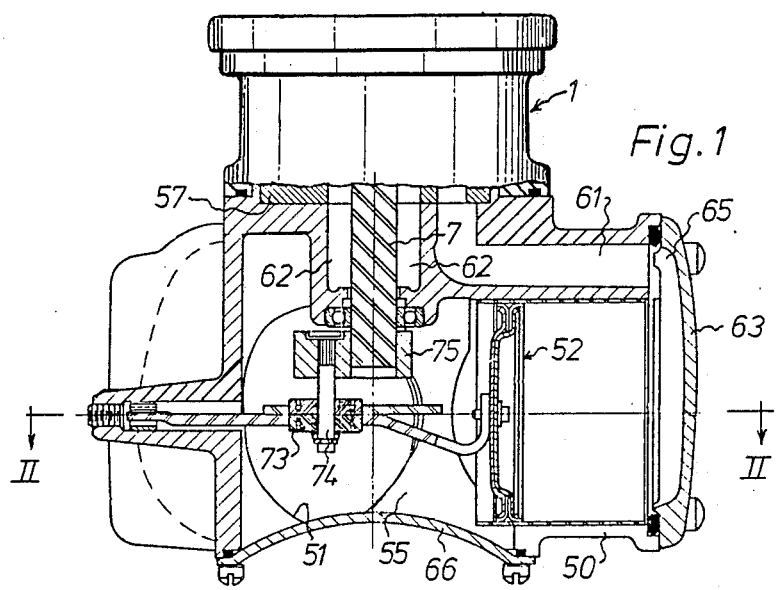
Figure 2:
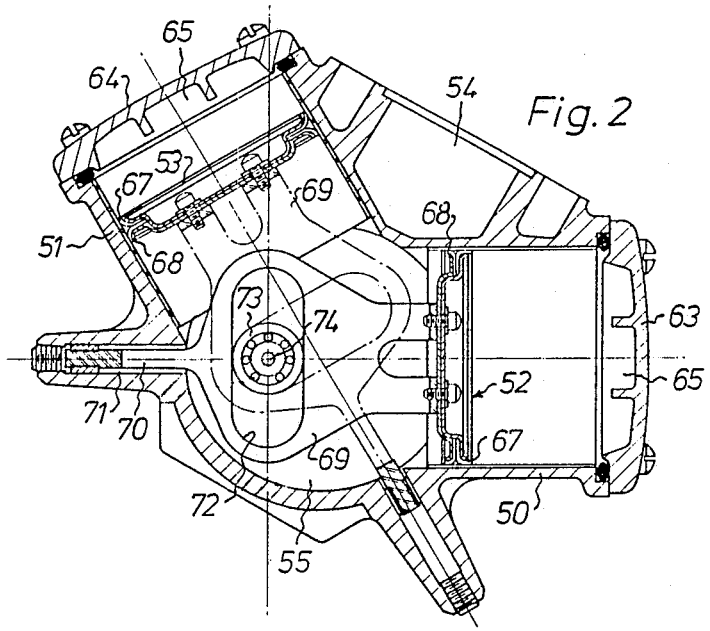
Figure 3:
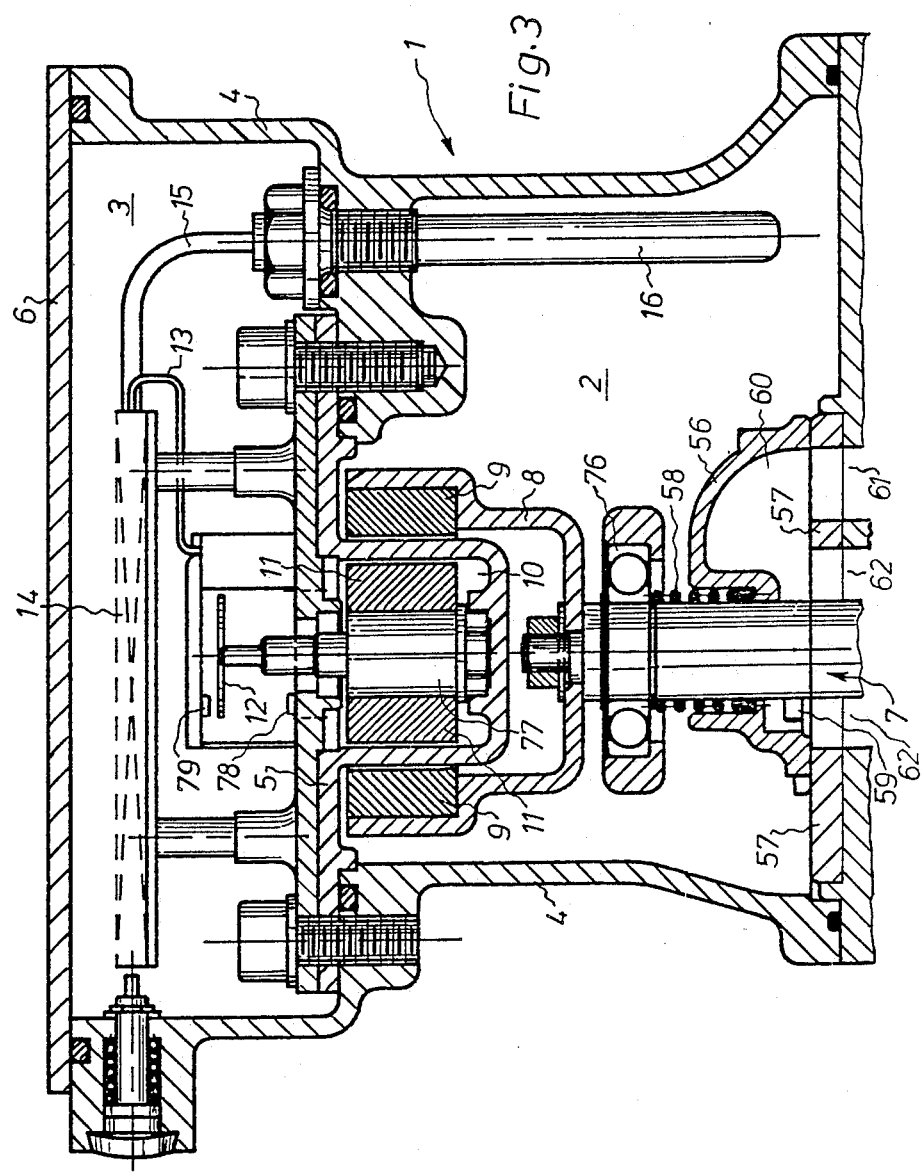

In FIGS. 1 and 2, there is schematically shown a fuel pump having a flow meter of conventional type, in which a measuring apparatus 1 according to the invention can advantageously be used. The flow meter has two cylinders or measuring chambers 50, 51 whose axes make an angle of 120° to each other. In these cylinders, pistons 52 and 53 are acting. Liquid enters through an inlet 54 and flows upwards into a valve chamber 2 (FIG. 3). A crankcase 55 forms a third measuring chamber utilizing the combined movement of the two pistons 52, 53. A valve 56 (FIG. 3) is held in contact with a graphite seal 57 by a spring 58 and by the pressure exerted by the surrounding liquid and is driven (rotated) by a pin 59 rigidly connected to and projecting from a crankshaft 7. A channel 60 in the valve 56 has its openings at a spacing of 180°. In the valve seat, i.e. the graphite seal 57, cylinder and crankcase openings 61 are provided with a spacing of 120°. At the ends of the cylinders 50, 51, there are provided covers 63, 64 each defining a connecting duct 65 opening into the cylinder opening 61. A cover 66 having sealing 0-rings is provided on the crankcase 55.

The pistons 52, 53 are of the double-acting type with opposed cup leathers or seals 67, 68. The pistons are connected to a yoke assembly 69 guided in a rectilinear movement by a guide pin 70 and a guide bore 71 in the wall of the crankcase 55. The yoke 69 has a transverse slot 72 in which the outer ring of a ball bearing 73 is movable back and forth. The inner ring of the ball bearing 73 is fixed to a crankpin 74. The crankpin 74 is rigidly connected to a crank 75 which in turn is rigidly connected to the crankshaft 7. The liquid leaves the cylinders 50, 51 or the crankcase 55 through the channel 60 in the valve 56 and an outlet 62. This arrangement bears substantial resemblance to the device of No. DE-A-2,926,451 and is previously known.

In FIG. 3, there is shown an example of the measuring apparatus 1 according to the present invention. This measuring apparatus comprises the above-mentioned valve chamber 2 and a space 3 for measuring equipment. The valve chamber 2 and the space 3 are defined by side walls 4 and separated by a wall 5. The space 3 is further delimited at the top by a cover 6. In the valve chamber 2, the upper end of the crankshaft 7 is mounted by means of a ball bearing 76. The rotation of the crankshaft 7 is a function of the volume of liquid flowing through the valve chamber 2. The crankshaft 7 has a holder 8 carrying an annular permanent magnet 9. A second shaft 77 is rotatably mounted in the space 3 in a depressed portion 10 of the partition 5. The second shaft 77 carries, like the holder 8, an annular permanent magnet 11 concentric with the magnet 9. The rotation of the shaft assembly 7, 77 is detected by pulse generator means which comprise an apertured disk 12 mounted on the top end of the shaft 77 an optical transmitter 78 and an optical receiver 79. The pulse generator means are used for determining both the degree of rotation and the direction of rotation of the shaft 77. The optical receiver 79 is connected by a line 13 to a computing unit 14 which in turn is connected by a line 15 to a temperature sensor 16 disposed in the valve chamber 2 and by lines (not shown) to units arranged outside the measuring apparatus, such as a display unit and a central computer, which are of conventional type and therefore not described in more detail here.

Figure 4:
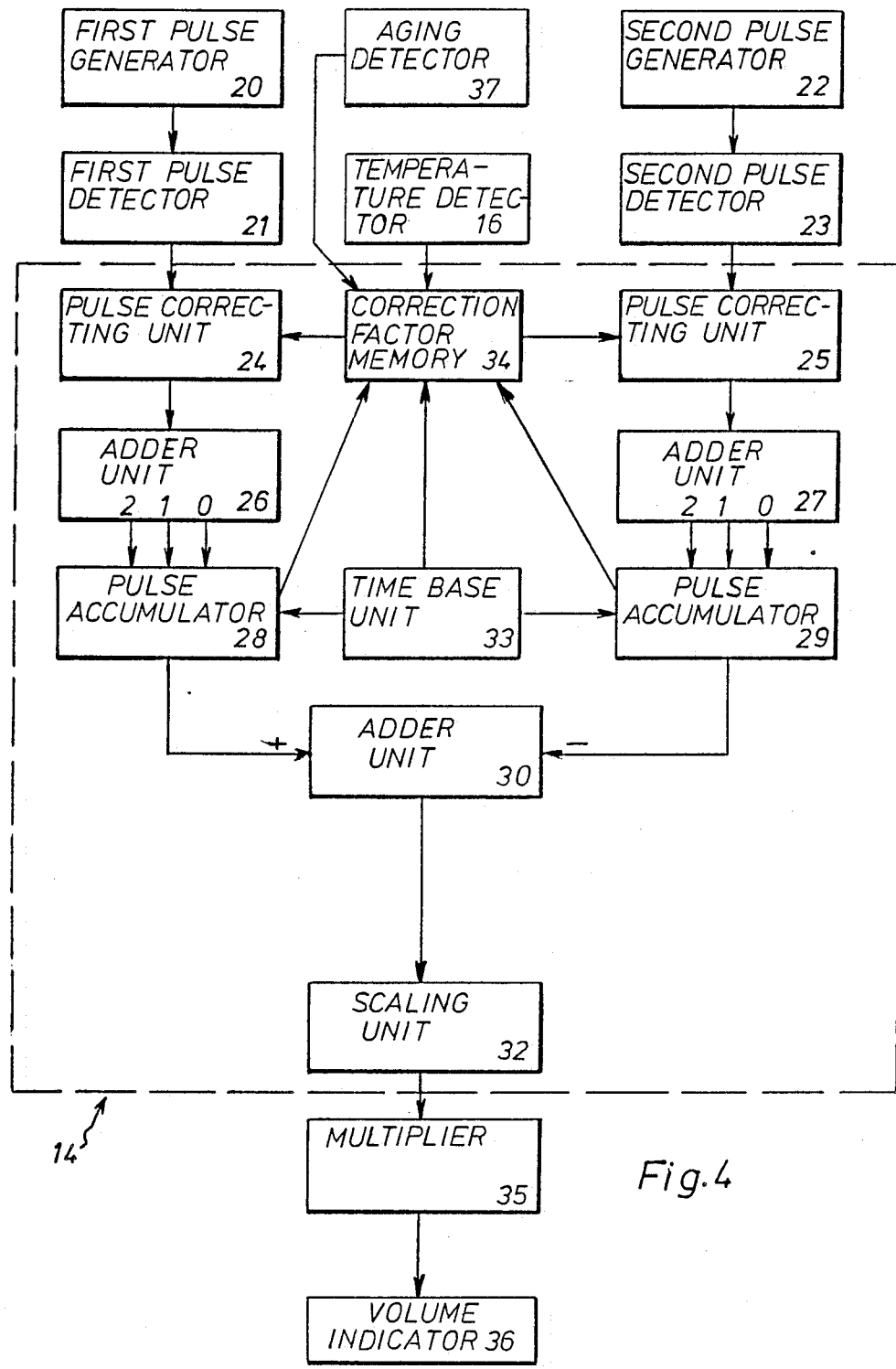
FIG. 4 is a block diagram schematically showing the principles of measurement according to an embodiment of the present invention.

FIG. 4 schematically shows the design of an embodiment of the measuring system according to the invention. This system can be used for determining the volume of the liquid flowing through the measuring apparatus during a measuring period. The measuring system has a first pulse generator 20 which may consist of the disk 12, the transmitter 78 and the receiver 79 and which is adapted to emit a predetermined number of pulses for each revolution the shaft assembly 7, 77 rotates in a first direction which, for example, is equal to the direction in which the shaft assembly normally rotates when dispensing petrol from a petrol storage tank at a filling station to the fuel tank of a vehicle. The pulse generator 20 is connected to a first pulse detector 21 adapted to detect the pulses emitted by the first pulse generator 20. Similarly, there is provided a second pulse generator 22 adapted to emit the same predetermined number of pulses for each revolution the shaft assembly 7, 77 rotates in a second direction. This second direction is equal to the direction in which the shaft assembly rotates when liquid flows back through the measuring apparatus into the petrol storage tank. The second pulse generator 22 is connected to a second pulse detector 23 adapted to detect the pulses emitted by the second pulse generator 22. In practice, the first and the second pulse generator 20 and 22, respectively, consist of a single generator by means of which the direction of rotation is detected in a suitable manner. For greater clarity, this single generator is shown as two separate blocks. The two pulse detectors 21 and 23 are each connected to an input of the computing unit 14. Each input of the computing unit is connected to a pulse-correcting computing unit 24 and 25, respectively, hereinafter referred to as "correcting unit". The output of this unit is connected to an adder unit 26 and 27, respectively. Each adder unit is in turn connected to a pulse accumulator 28 and 29, respectively. The outputs of the pulse accumulators 28 and 29 are connected to the positive input and the negative input, respectively, of an adder unit 30. The output of the adder unit 30 is connected to a scaling unit 32, i.e. a unit which rescales signals received. The computing unit 14 further has a time base unit 33 having an output connected to each pulse accumulator 28 and 29, and an output connected to a correction factor memory 34. This memory contains different correction factors used in the volume calculation and is connected to the two correcting units 24 and 25. The pulse accumulators 28, 29 are connected to the memory 34 for a purpose which will be discussed in more detail below. The output of the computing unit is connected to the input of a counter, a computer or similar unit, represented in FIG. 2 by a multiplier 35. In the multiplier 35, conversion of pulse number into volume is effected. The output of the multiplier 35 is connected to a display or other volume indicator 36 for presenting the measuring results.

In preferred embodiments of the invention, an aging detector 37 and a temperature detector 16 are also connected to the correction factor memory 34.

The function of the measuring system shown in FIG. 4 will now be described in more detail. The first pulse generator 20 thus generates a predetermined number of pulses for each revolution of the shaft assembly 7, 77. These pulses are detected by the first pulse detector 21 and supplied to the input of the computing unit 14. In the correcting unit 24, each pulse is corrected or "multiplied" by one or more correction factors retrieved from the memory 34. As earlier mentioned, the size of the measuring error varies with the flow rate of the liquid. In other words, one revolution of the shaft assembly 7, 77 does not correspond exactly to the same volume at all different flow rates. Therefore, flow rate correction is always carried out in the correcting unit 24. The memory 34 stores a list which contains the correction factors corresponding to different flow rates and all having a value close to 1. Preferably, there is one correction factor for each flow rate in liter per minute. This list of correction factors is established by accurate measurement and testing of a large number of flow meters of the type employed.

To permit selecting a suitable correction factor for correcting a pulse in the correcting unit 24, the measuring period during which the liquid volume flowing through the measuring apparatus is measured, is divided into a large number of measuring intervals of very short duration, for instance 50 ms, the duration of the measuring intervals being established by means of the time base unit 33. During this short measuring interval, the flow rate can be assumed to be approximately constant. By the short duration of the measuring intervals, the flow rate will also vary but to a very small extent between two consecutive measuring intervals. During each separate measuring interval, the same correction factor can therefore be used for all pulses which are detected during that interval. The suitable correction factor for a specific measuring interval is determined by summing up the corrected pulse values for the pulses detected during a preceding measuring interval, thus giving a value of the flow rate which is used for retrieving the corresponding correction factor in the list stored in the memory 34. This summation takes place in the pulse accumulators 28, 29 which therefore are connected to the correction factor memory 34.

In addition to flow rate correction, other corrections can also be effected in a similar manner in the correcting unit 24. Such corrections may include a correction for the temperature of the liquid, in which case the temperature is measured by the detector 16 and a correction factor corresponding to the temperature is retrieved from a list stored in the memory 34. Another such correction may be correction for aging of the measuring means. In this latter case, use is made of a correction factor the magnitude of which is a function of the total liquid volume measured by the measuring apparatus and which is established experimentally by aging tests on the measuring apparatus concerned.

Each corrected pulse value is supplied from the correcting unit 24 to the adder unit 26 in which it is added to a first intermediate storage variable. Then, the integer part of the value of the first intermediate storage variable is obtained. This integer part is subtracted from the first intermediate storage variable and supplied to the pulse accumulator 28 in which it is added to a first summation variable. Since the pulse values (like the correction factors) are approximately equal to 1 and since these operations are effected for each pulse value supplied to the adder unit, the integer part always becomes equal to 2, 1 or 0, which is schematically shown in the Figure. In the pulse accumulator 28, the integer parts from the adder unit 26 are summed up during each measuring interval.

Pulses generated by the second pulse generator 22 are processed in a similar manner. The pulses are detected by the second pulse detector 23 supplying them to the pulse-correcting computing unit 25 in which each pulse is corrected or multiplied by the same correction factor, retrieved from the memory 34, as used in the correcting unit 24 for the same measuring interval. Each corrected pulse value is supplied to the adder unit 27 and added therein to a second intermediate storage variable. The integer part of the value of the second intermediate storage variable is thereafter obtained. This integer part is subtracted from the second intermediate storage variable and added to a second summation variable in the pulse accumulator 29. As earlier, the second summation variable is supplied back to the memory 34 to enable the suitable correction factor for the immediately following measuring interval to be supplied from the memory 34 to the correcting unit 25.

The pulse sums accumulated in the pulse accumulators 28 and 29 during each measuring interval are supplied upon activation by a signal from the time base unit 33 to the positive and the negative input, respectively, of the adder unit 30. The net number of pulses for the measuring interval is then obtained. This net number is added to a third summation variable in a scaling unit 32, and the value of the third summation variable is integer-divided by a scale factor. Preferably, use is made of different scale factors if the net number of pulses exceeds or falls below 0, i.e. if the number of pulses in the first direction is larger or smaller than the number of pulses in the other direction. In the first case, the scale factor may for instance be equal to 10. Scaling is effected in order to make the measuring apparatus less sensitive to disturbance. By the scaling, occasional incorrect pulses will not have any major effect since, for example in the above-mentioned case using scale factor 10, at least 10 pulses are required for having a pulse supplied from the computing unit 14 to the equipment connected thereafter, in this case the multiplier 35. The remainder from the integer division in the scaling unit 32 is stored in the third summation variable while the result of the integer division is output from the computing unit 14 to be supplied to the multiplier 35 in which the number of pulses determined during each measuring interval is multiplied by a volume conversion factor.

It should be pointed out that the flow correction factor for correcting the flow rate-dependent measuring error is determined experimentally.

Further, it should be noted that the correcting, adder, pulse accumulating, scaling and multiplier units are electronic devices known to those skilled in the art and therefore not described in more detail here.

FIG. 5 shows an example of good correction obtainable electronically by means of the invention. The curves have been measured with an equipment of the type shown in FIGS. 1-4, with and without electronic correction. The measurements were carried out at varying flow rates in the range of 2-75 1/min. Without electronic correction according to the invention, the dashed error curve was obtained, from which it appears that the volume errors are greatest at low and high flow rates and that measuring errors also occur at normal flow rates of 25-40 1/min, used when supplying fuel to fuel tanks. When electronic correction was carried out according to the invention using the same flow meter, the error curve indicated by a full line was obtained. When comparing the two curves, it can be seen that the error was reduced by half or more at high and low flow rates.

As will have been appreciated from the above, the correction of the volume measurement values takes place almost instantaneously when using the invention. This means that the measuring accuracy can be increased to a considerable extent as compared with what is possible with prior art equipments in which flow rate-dependent correction is carried out. Since correction is also carried out internally in the computing unit 14, several advantages are gained, e.g. that the possibilities of tampering with the measuring equipments are reduced, that the following equipment need not necessarily be modified and that the measuring equipment becomes less sensitive to disturbance, such as sudden pressure surges in the liquid inlet and liquid outlet conduits.

We claim:

1. Method for measuring the volume of a liquid flowing through a measuring chamber (2, 50, 51, 55) during a measuring period, during which a number of pulses corresponding to the volume is generated by a pulse generator (12, 78, 79), which method comprises the steps of dividing the measuring period into a number of measuring intervals, detecting the pulses in each measuring interval and multiplying the detected pulses by a flow correction factor, characterized by the steps, during each measuring interval, of:

detecting the pulses from the pulse generator (12, 78, 79), multiplying each separate detected pulse by a flow correction factor which has been selected on the basis of the sum of the corrected pulse values for one or more of the preceding measuring intervals, adding the corrected pulse values to a summation variable and multiplying the value of this summation variable by a volume conversion factor for determining the liquid volume during the measuring interval concerned, and by the step of summing up the liquid volumes for all measuring intervals during the measuring period.

2. Method as claimed in claim 1, characterized by carrying out the step of adding the corrected pulse values to the summation variable, by adding each corrected pulse value to an intermediate storage variable, by determining the integer part of the value of said intermediate storage variable, by subtracting this integer part from the intermediate storage variable, and by adding this integer part to said summation variable.

3. Method as claimed in claim 1, in which the measurement is carried out by means of two pulse generators emitting number of pulses corresponding to the volume when the liquid is flowing in one or the other direction through the measuring chamber, characterized by the steps, during each measuring interval, of detecting the pulses from the first and the second pulse generator, multiplying each separate detected pulse by the flow correction factor, adding the corrected pulse values of the first pulse generator to a first summation variable, adding the corrected pulse values of the second pulse generator to a second summation variable, and subtracting the second summation variable from the first summation variable before the step of multiplying the value of this summation variable by the volume conversion factor.

4. Method as claimed in claim 3, characterized by carrying out the step of adding the corrected pulse values to the second summation variable, by adding each corrected pulse value to a second intermediate storage variable, by determining the integer part of the value of the second intermediate storage variable, by subtracting this integer part from said second intermediate storage variable, and by adding this integer part to said second summation variable.

5. Method as claimed in claim 1, characterized in that the flow correction factor has a value in the range of 0.0000–2.0000.

6. Method as claimed in claim 1, characterized by the steps, during each measuring interval, of integer-dividing the value of the summation variable by a first scale factor if the value of the summation variable is above 0, and by a second scale factor if the value of the summation variable is below 0, setting the summation variable equal to the remainder of the integer division, and multiplying the result of the integer division by the volume conversion factor for determining the liquid volume.

7. Method as claimed in claim 1, characterized by the steps, during each measuring interval, of correcting each detected pulse by a temperature correction factor which has been selected on the basis of the temperature determined during the preceding measuring interval.

8. Method as claimed in claim 1, characterized by the steps, during each measuring interval, of correcting each detected pulse by an aging correction factor which has been selected on the basis of the total liquid volume that has flown through the measuring chamber.

* * * * *

UNITED STATES PATENT AND TRADEMARK OFFICE
CERTIFICATE OF CORRECTION

PATENT NO. : 4,969,365

DATED : November 13, 1990

INVENTOR(S) : Bengt-Olof Strigård; Tord Andreasson

It is certified that error appears in the above-identified patent and that said Letters Patent is hereby corrected as shown below:

Title page, Inventors:
    "StrigÅrd" should be --Strigård--

Col. 2, line 68
    "GB-A1,501,877" should be --GB-A-1,501,877--

Col. 3, line 5
    delete "in" (1st)

Col. 4, line 20
    "2 0000" should be --2.0000--

Col. 5, line 24
    delete the comma after "present"

Signed and Sealed this

Sixteenth Day of June, 1992

*Attest:*

DOUGLAS B. COMER

*Attesting Officer*      *Acting Commissioner of Patents and Trademarks*